US005166911A

United States Patent [19]

Misawa et al.

[11] Patent Number: 5,166,911

[45] Date of Patent: Nov. 24, 1992

[54] TIMER RESERVATION RECORDING SYSTEM

[75] Inventors: Seiichi Misawa, Saitama; Hidemi Tomitsuka; Hideaki Ishioka, both of Kanagawa, all of Japan

[73] Assignee: Sony Corporation, Tokyo, Japan

[21] Appl. No.: 641,304

[22] Filed: Jan. 15, 1991

[30] Foreign Application Priority Data

Jan. 18, 1990 [JP] Japan .................................. 2-10159

[51] Int. Cl.[5] ........................ G04B 47/00; H04N 5/76

[52] U.S. Cl. ...................................... 368/10; 358/335; 360/33.1

[58] Field of Search .............................. 368/10, 28-29, 368/107-115; 358/191.1, 191.4, 335; 360/10.1, 14.1, 3g33 3

[56] References Cited

U.S. PATENT DOCUMENTS 4,325,081 4/1982 Abe et al. ............................ 358/335

4,519,003 5/1985 Scholtz ............................... 360/33.1

4,641,205 2/1987 Beters, Jr. .......................... 360/33.1

4,786,982 11/1988 Waisahara et al. ................ 360/53.1

4,847,696 5/1989 Matsumato et al. ................ 358/335

5,056,070 10/1991 Shibuta et al. ........................ 368/10

FOREIGN PATENT DOCUMENTS 0342964 11/1989 European Pat. Off. .

*Primary Examiner*—Vit W. Miska

*Attorney, Agent, or Firm*—Alvin Sinderbrand; William S. Frommer

[57] ABSTRACT

In an apparatus for timer reservation recording, previously inputted reservations for a program are recorded in a habit database together with a degree of certainty which is reviewed according to the frequency of reservation inputting for the program. When a timer reservation is made, reservations are found in the habit database and displayed in order according to their probability of being for the same program for which a reservation is being made, thereby assisting the user to easily and positively make a timer reservation for a desired program.

9 Claims, 15 Drawing Sheets

| | |
|---|---|
| DAY OF THE WEEK | SUNDAY |
| CONTINUOUS RESERVATION END DAY | 0 |
| RESERVATION START TIME | 20:00 |
| RESERVATION END TIME | 20:45 |
| CHANNEL | 1 |
| CHANNEL ATTRIBUTE | T |
| MODE | βII |
| OWNER | 1 |
| DEGREE OF CERTAINTY | 20 |
| LAG IN START TIME | 0 |
| LAG IN END TIME | 0 |

INITIALIZATION REGISTRATION

| | |
|---|---|
| PACKET ID | 1 |
| DAY OF THE WEEK | SUNDAY |
| CONTINUOUS RESERVATION END DAY | 0 |
| RESERVATION START TIME | 19:59 |
| RESERVATION END TIME | 21:00 |
| CHANNEL | 1 |
| CHANNEL ATTRIBUTE | T |
| MODE | βII |
| OWNER | 1 |

REGISTRATION PACKET

FIG. 18

| | |
|---|---|
| DAY OF THE WEEK | SUNDAY |
| CONTINUOUS RESERVATION END DAY | 0 |
| RESERVATION START TIME | 20:00 |
| RESERVATION END TIME | 20:45 |
| CHANNEL | 1 |
| CHANNEL ATTRIBUTE | T |
| MODE | βII |
| OWNER | 1 |
| DEGREE OF CERTAINTY | 60 |
| LAG IN START TIME | -1 |
| LAG IN END TIME | 15 |

RENEWAL OF DATA BASE

FIG. 19

| | |
|---|---|
| DAY OF THE WEEK | SUNDAY |
| CONTINUOUS RESERVATION END DAY | 0 |
| RESERVATION START TIME | 19 : 59 |
| RESERVATION END TIME | 21 : 00 |
| CHANNEL | 1 |
| CHANNEL ATTRIBUTE | T |
| MODE | βII |
| OWNER | 1 |
| DEGREE OF CERTAINTY | 80 |
| LAG IN START TIME | 0 |
| LAG IN END TIME | 0 |

RENEWAL OF DATA BASE

FIG. 20

| |
|---|
| WEEK |
| CONTINUOUS RESERVATION END DAY |
| RESERVATION START TIME |
| RESERVATION END TIME |
| A.M./P.M. |
| CHANNEL |
| 0 |
| 0 |

INQUIRY MASK

FIG. 21

| | |
|---|---|
| PACKET ID | 2 |
| DAY OF THE WEEK | SUNDAY |
| CONTINUOUS RESERVATION END DAY | 0 |
| RESERVATION START TIME | 20:00 |
| RESERVATION END TIME | 0 |
| CHANNEL | 0 |
| CHANNEL ATTRIBUTE | 0 |
| MODE | 0 |
| OWNER | 0 |

INQUIRY PACKET

FIG.22

| | |
|---|---|
| DAY OF THE WEEK | SUNDAY |
| CONTINUOUS RESERVATION END DAY | 0 |
| RESERVATION START TIME | 20:00 |
| RESERVATION END TIME | 20:45 |
| CHANNEL | 1 |
| CHANNEL ATTRIBUTE | T |
| MODE | βII |
| OWNER | 1 |
| DEGREE OF CERTAINTY | 80 |

RETURN LIST

FIG. 23

| | |
|---|---|
| PACKET ID | 3 |
| DAY OF THE WEEK | SUNDAY |
| CONTINUOUS RESERVATION END DAY | 0 |
| RESERVATION START TIME | 20:00 |
| RESERVATION END TIME | 20:45 |
| CHANNEL | 1 |
| CHANNEL ATTRIBUTE | T |
| MODE | βII |
| OWNER | 1 |

MODIFICATION PACKET AND CANCELATION PACKET

FIG. 25

| | |
|---|---|
| DAY OF THE WEEK | SUNDAY |
| CONTINUOUS RESERVATION END DAY | 0 |
| RESERVATION START TIME | 19:59 |
| RESERVATION END TIME | 21:00 |
| CHANNEL | 1 |
| CHANNEL ATTRIBUTE | T |
| MODE | βII |
| OWNER | 1 |
| DEGREE OF CERTAINTY | 80 → 60 |

MODIFIED OR CANCELED DATA BASE

FIG. 26

| | |
|---|---|
| PACKET ID | 1 |
| DAY OF THE WEEK | SUNDAY |
| COTINUOUS RESERVATION END DAY | 0 |
| RESERVATION START TIME | 20:00 |
| RESERVATION END TIME | 20:45 |
| CHANNEL | 3 |
| CHANNEL ATTRIBUTE | T |
| MODE | βII |
| OWNER | 1 |

REGISTRATION PACKET

TIMER RESERVATION RECORDING SYSTEM

BACKGROUND OF THE INVENTION

This invention relates to a timer reservation recording system, used, for example, with a video tape recorder.

Conventional video tape recorders are capable of performing recording a when actuated by a timer.

With this timer, a user can record a desired program only by previously inputting a timer reservation, which is itself stored.

When a timer reservation is inputted, each of the elements thereof (hereinafter referred to as reservation information elements), such as the channel broadcasting the program to be recorded, time to start the recording, and time to end the recording, must be sequentially inputted by repeatedly operating members, for example, pressing keys on a panel. When an input is erroneously made, the desired program will not be recorded.

It is difficult to input a timer reservation for a desired program since laborious operations must be done without any error.

In order to overcome this difficulty, it has been proposed to provide a synthetic voice output in response to operation of an operating member and by which reservation information elements are inputted for storage, or to employ bar codes in place of operating members for inputting reservation information elements.

However, erroneous input of reservation information elements may still occur when using the methods above mentioned, so these methods are still not sufficient.

SUMMARY OF THE INVENTION

In view of the foregoing, an object of the present invention is to provide an apparatus for timer reservation recording which permits timer reservations for the recording of desired programs to be easily and positively input.

Another object of the present invention is to provide an apparatus for timer reservation recording which assists inputting of timer reservations on the basis of timer reservations that were previously input.

The foregoing and other objects of the present invention have been achieved by the provision, in an apparatus for timer reservation recording which includes: input means for sequentially inputting reservation information elements indicating programs and their respective recording start and end times displaying means for displaying the reservation information elements, storing means for storing the reservation information, elements and output means for outputting the reservation information elements from the storing means; the combination of database means for recording previously inputted reservation information elements together with respective certainty degree information which is renewed when the reservation information elements are recorded; and database management means operative when the reservation information elements are input to the inputting means, to search reservation information elements recorded in said database means for reservation information elements which are identical to the inputted reservation information elements, and to display, in an order and according to the certainty degree information reservation information elements obtained from the search as proposed reservation information elements for each augmenting the inputted reservation information elements.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 14 is a flow chart showing an initialization procedure for the habit database;

FIGS. 17 to 23 are diagrammatic views illustrating timer reservation recording in the habit database;

FIGS. 25 to 27 are diagrammatic views illustrating timer reservation modification;

FIG. 28 is a flow chart showing the cancelation procedure of a timer reservation.

DETAILED DESCRIPTION OF THE PREFERRED EMBODIMENT

Figure 1:
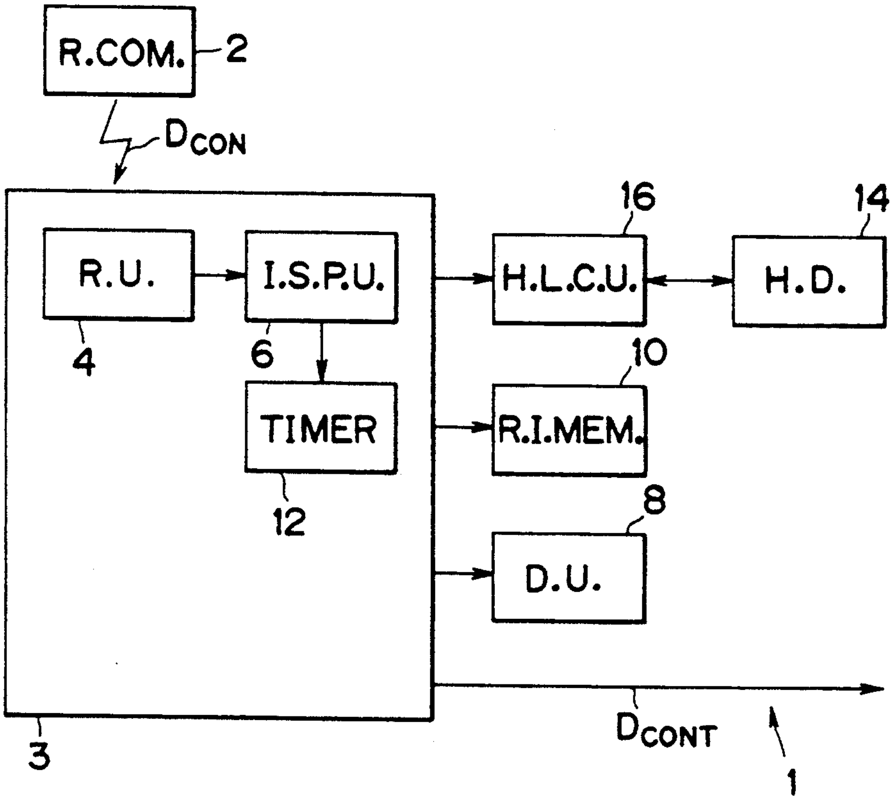
FIG. 1 is a block diagram showing an apparatus for timer reservation recording in accordance with an embodiment of the present invention.

Referring to the drawings, a preferred embodiment of the present invention will be described hereinafter.

(1) Construction of the Preferred Embodiment

In FIG. 1, 1 generally designates a timer reservation recording system of a video tape recorder, which is actuated according to reservation information elements inputted from a remote commander 2.

Figure 2:
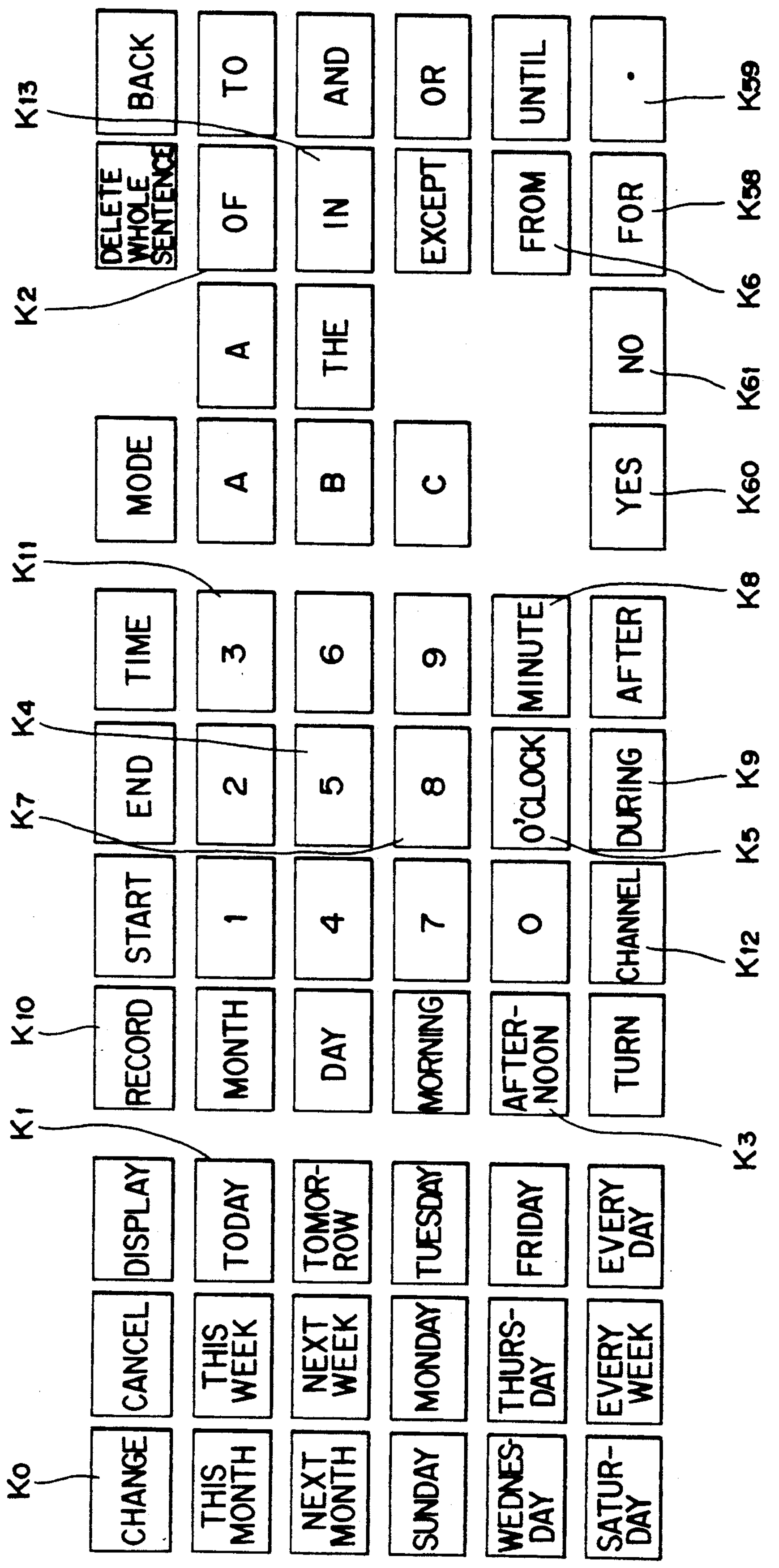
FIG. 2 is a plan view illustrating a keypad of a remote commander that may be used with the apparatus of FIG. 1.

As shown in FIG. 2, the remote commander 2 has operation members $K_0$–$K_{61}$, for example, in the form of push-buttons or keys, disposed on an operation panel thereof, and operation information $D_{CON}$ is sent to a reservation information input unit 3 in response to operations of operation members $K_0$–$K_{61}$.

The reservation information input unit 3 receives the operation information $D_{CON}$ at a receiving unit 4 and the operation information $D_{CON}$ is analyzed in an input sentence processing unit 6 having a configuration of an arithmetic processing circuit.

The user can make a timer reservation in a natural language sentence format by operating the operation members of the remote commander 2.

More specifically, on the operation panel, there are arranged: operation members to input numerals "0" to "9"; operation members to input a record day, such as, "this month", "this week", . . . , "next month", "next week", . . . , "Sunday", "Monday", . . . , "every week", "every day", "month", and "day"; operation members to input a record time, such as, "time", "morning", "afternoon", "o'clock", "minute", A.M. (not shown), P.M. (not shown) and operation members for indicating "during" and "after". there are further provided operation members to input operations, such as turn "change", "delete" and "record", operation members to input prepositions, such as, "of", "to", "in", "on", "between", operation members to input punctuation, such as ".", and operation members indicate responses, such as, "yes" and "no".

With these operation members, for example, a sentence in a natural language format (hereinafter referred to as a reservation sentence) can be inputted by sequentially operating operation members "record" "from" "5" "o'clock" "in" "afternoon" "of" "today" "8" "minute" ".".

The reservation information input unit 3 analyzes the inputted reservation sentence at the input sentence processing unit 6 and extracts reservation information elements from the inputted reservation sentence.

If a timer reservation is entered in a natural language sentence, the same program may be recorded by inputting according to the user's habit "The Television broadcasting of 4 channel should be recorded from 9 P.M. to 10 P.M." or "The Television broadcasting of 4 channel should be recorded from 9 P.M. to 10 P.M. on January 1."

The recording time may be input in formats such as "from 9 P.M. to 10 P.M.", "from 21 o'clock to 22 o'clock" to indicate 24 hour format, and "one hour from 9 P.M." to indicate record start time and record hour.

In the reservation information input unit 3, the grammer of the reservation sentence is analyzed to extract reservation information elements, and timer reservations may be positively carried out even when made by different users of a remote commander.

The input sentence processing unit 6 distinguished users who have inputted a reservation sentence according to their order of inputting reservation information elements and how they express the recording time, which are different from one user to the next.

In this manner, the timer reservation recording system 1 assists the making of timer reservations by different users.

After displaying the inputted reservation sentence in a display unit 8, which is constituted, for example by a liquid crystal display unit, and after the operating member "yes" has been actuated for confirming the displayed sentence, the reservation information input unit 3 sequentially inputs analyzed reservation information elements to a reservation information memory unit 10.

Furthermore, the reservation information input unit 3 detects the present time using a timer 12 and loads reservation information elements stored in the reservation information memory unit 10 in a predetermined cycle for judging whether or not the present time is the record start time.

The reservation information input unit 3 outputs control data $D_{CONT}$ according to the reservation when the present time is the record start time and thereby starts program recording in accordance with the previously input a timer reservation. When it is the record end time, control data $D_{CONT}$ is outputted to end program recording in accordance with the timer reservation.

The reservation information input unit 3 refers to previously inputted reservation information elements recorded in a habit database 14 when a timer reservation is inputted and thereby judges whether or not all the necessary reservation information elements to indicate a program are inputted. In the case where the reservation information elements are not sufficient to indicate a program, a message to prompt a further input is displayed on the display unit 8.

In this event, the reservation information input unit 3 displays previously inputted reservation information in a selective manner to assist the user's input operation.

For this purpose, the reservation information input unit 3 inputs reservation information to and outputs it from a habit learning control unit 16 according to need.

(1-1) Habit Database

Figure 3:
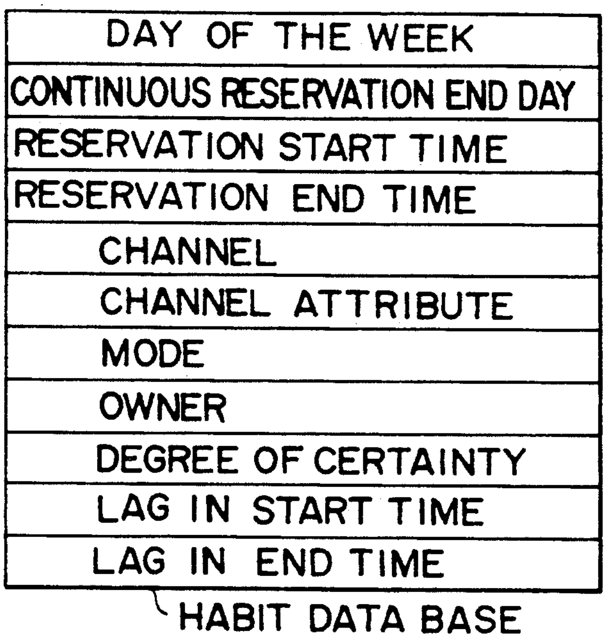
FIG. 3 is a diagrammatic view illustrating the data format of a reservation in a habit database.

As shown in FIG. 3, the habit database 14 records a reservation outputted from the habit learning control unit 16, with a degree of certainty information element for each program reservation. FIGS. 5-13 are detailed illustrations of the data formats used for the various information elements included in the formats of FIGS. 3 and 4.

Figure 4:
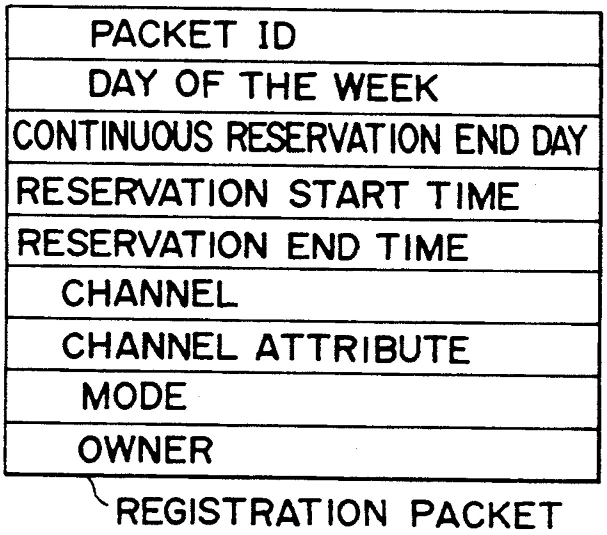
FIG. 4 is a diagrammatic view illustrating the data format of a registration packet.

More specifically, the habit database 14 receives a registration packet in a format shown in FIG. 4 from the input sentence processing unit 6 through the habit learning control unit 16 and removes a packet ID information element from the registration packet, which is then recorded, as shown in FIG. 3, with a certainty degree information element indicating a frequency of use of the reservation, record start time and record end time.

Figure 5:
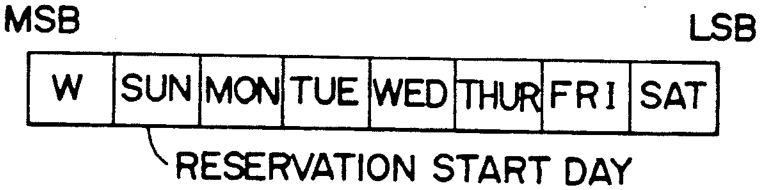
FIGS. 5 to 13 are diagrammatic views illustrating respective data formats for reservation information elements of the habit database.
Figure 6:
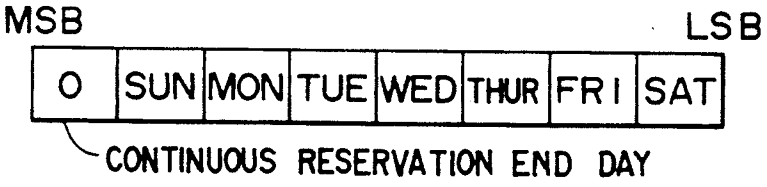

As illustrated in FIGS. 5 and 6, in the registration packets and the habit database 14, a day of the week (a record start day of the week in the case of a continuous reservation) and whether or not the reservation is an every week reservation (designated by the letter W in the format shown on FIG. 5) are expressed in 8 bit data. In the case of a continuous reservation, the following data in the format shown on FIG. 6 represents the day of the end of the continuous reservation.

Figure 7:
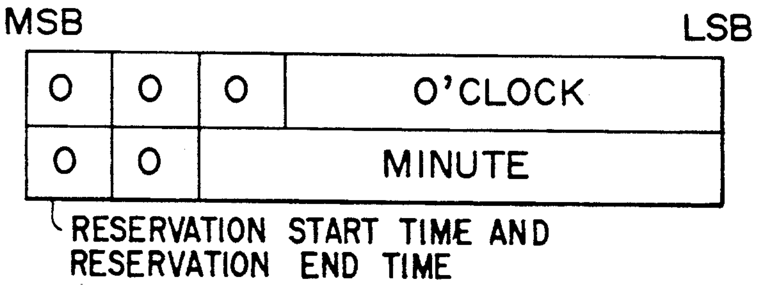

The record start time and the record end time are, as shown in FIG. 7, represented in the following 16 bits of data. In the present embodiment, such times are expressed in a 24 hour format with o'clock (hour) data and minute data separated from each other.

Figure 8:
Figure 9:
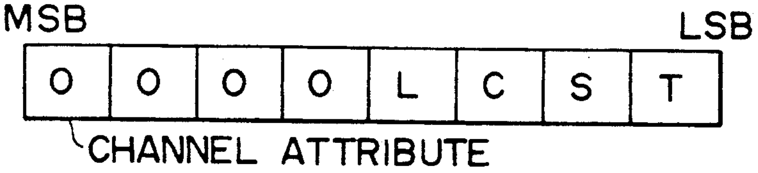

As illustrated in FIG. 9, a line input (indicated by letter L), a cable television broadcast (indicated by letter C), a satellite broadcast (indicated by letter S) and an ordinary television broadcast (indicated by letter T) are discriminated by channel attribute data, and the channel of an input source specified by a channel attribute is expressed by a channel information element, as in FIG. 8.

Figure 10:
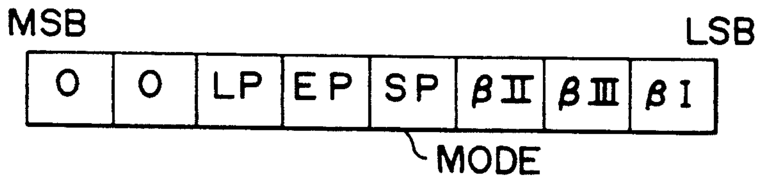
Figure 11:
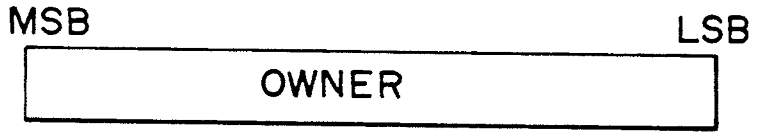

As shown in FIGS. 10 and 11, the following data "mode" and data "owner" identify a recording mode of the video tape recorder and a user who has inputted the reservation, respectively.

Thus, in the embodiment being described, stored reservation information is associated with individual users who have inputted it, and, as will be described previously imputted reservation information elements are selectively displayed to assist the making of a timer reservation by the user.

Figure 12:
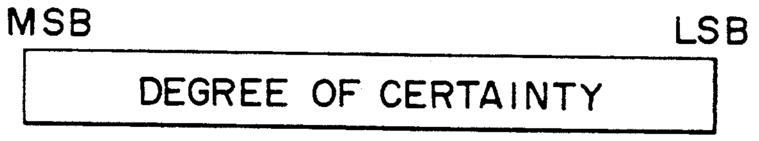

The following data in FIG. 3 represents a degree of certainty information element which, as shown in FIG. 12, is a value between 0 and 100, representing the frequency of use of the inputted reservation expressed.

Figure 13:
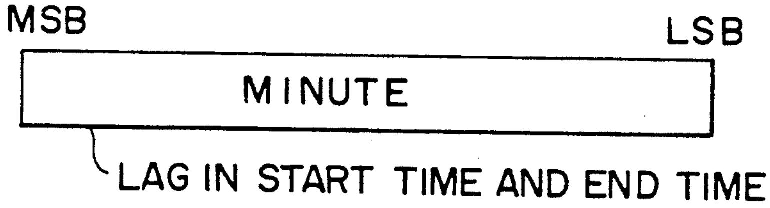

As illustrated in FIG. 13, the following data log in "start time and end time" represents differences from a repeatedly reserved program's record start time and record end time. This data permits the original reservation information elements to be reconstructed even if the reservation information repeatedly inputted is not exactly renewed.

In ordinary television broadcasting, a commercial advertisement or the like often broadcast before the beginning of the program. For example, the actual program may be broadcast from beginning at two minutes past nine.

In this case, the user may set the record start time to nine o'clock or two minutes past nine.

The record end time of a program, such as a night game, can be indefinitely delayed, and hence the record end time of the program may be set to ten o'clock or half past ten.

In view of this, each of the record start time and the record end time may be set to have a permissible range of 5 to 40 minutes before and after the original reservation time. Within the permissible range, it is possible to judge whether or not the reservation information relates to the same program as we previously reserved.

(1-2) The Input Sentence Processing Unit and the Habit Learning Control Unit

The habit learning control unit 16 records reservation information, outputted from the input sentence processing unit 6, to the habit database 14 and when the information of the same program was previously recorded, the habit learning control unit 16 renews the certainty degree of the previously inputted reservation.

When a reservation is inputted, the reservation information elements of the same program are searched for among the recorded reservation information elements and are displayed on the display unit 8 to assist the user in making a timer reservation.

For this purpose, the habit learning control unit 16 initializes the habit database 14 as described below.

(1-2-1) Initialization of the Habit Database

Figures 14, 17:
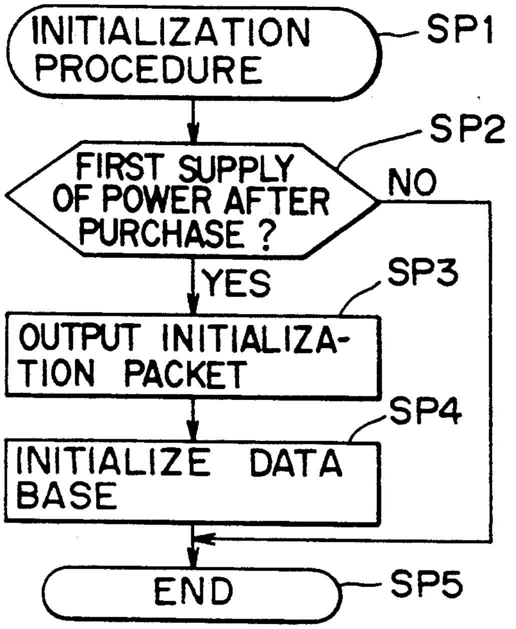

Initialization of the habit database 14 is effected by the routine shown in FIG. 14 and which is started in step SP1. The timer reservation recording system 1 proceeds from step SP1 to a step SP2 in which the input sentence processing unit 6 judges whether or not this is the first time after since the purchase of the video tape recorder that the power has been turned on.

If the answer to step SP2 is "yes", when a predetermined operating member (not shown) is actuated, the timer reservation recording system 1 proceeds to a step SP3, in which an initialization packet is outputted from the input sentence processing unit 6 to the habit learning control unit 16.

The initialization packet has the format shown in FIG. 4, with the packet ID set to a value of 6 and the owner data set to a value of 255.

When the initialization packet is inputted, the habit learning control unit 16 initializes the habit database 14 in step SP4, and then in a step SP5 the procedure is completed.

When a negative result is obtained in the step SP2, the initialization procedure is bypassed, going directly to the step SP5.

(1-2-2) Renewal and Recording of the Habit Database

When the initialization operation is completed, the habit learning control unit 16 records reservations outputted from the input sentence processing unit 6 and thereby constructs the habit database 14.

Figure 15:
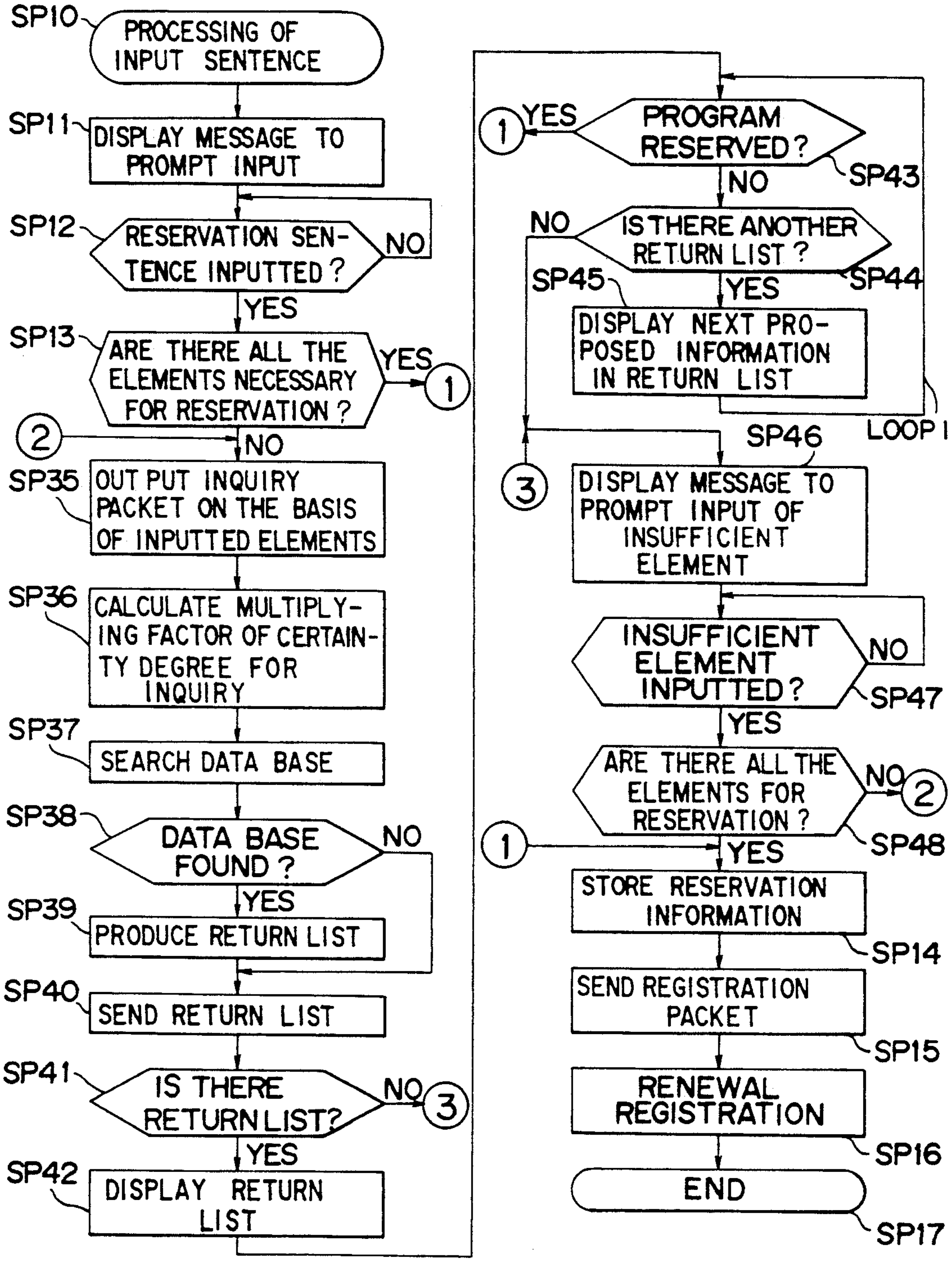
FIG. 15 is a flow chart showing the processing of an input sentence.

More specifically, as shown in FIG. 15, when the remote commander 2 is operated, the timer reservation recording system 1 proceeds from a start step SP10 to a step SP11, in which a message to prompt an input of a reservation sentence is displayed on the display unit 8. Then, the timer reservation recording system 1 proceeds to a step SP12 in which it judges whether or not a reservation sentence is inputted.

When an input sentence is not inputted, a negative result is obtained, and the input sentence processing unit 6 repeats the step SP12.

Where an input sentence is inputted, an affirmative response is obtained in step SP12, and then the input sentence processing unit 6 proceeds to a step SP13, in which the input sentence is analyzed, and it is judged whether or not all the necessary reservation information elements to indicate a program have been inputted.

When an affirmative outcome is obtained in step SP13, the program proceeds to a step SP14, in which the reservation information elements are stored in the reservation information memory unit 10. Then, the program proceeds to a step SP15, in which a registration packet is produced from the inputted reservation information elements, and the registration packet is sent to the habit learning control unit 16.

Thus, in the input sentence processing unit 6 a timer reservation is stored according to the inputted reservation and then the reservation is outputted to the habit learning control unit 16.

In response to the registration packet, the habit learning control unit 16 executes a renewal registration processing of the habit database 14 in a step SP16 on the basis of the registration packet outputted from the input sentence processing unit 6 and then in a step SP17 the input sentence processing procedure is completed. The step SP16 of renewal registration in FIG. 15 will now be described in detail with reference to FIG. 16.

Figure 16:
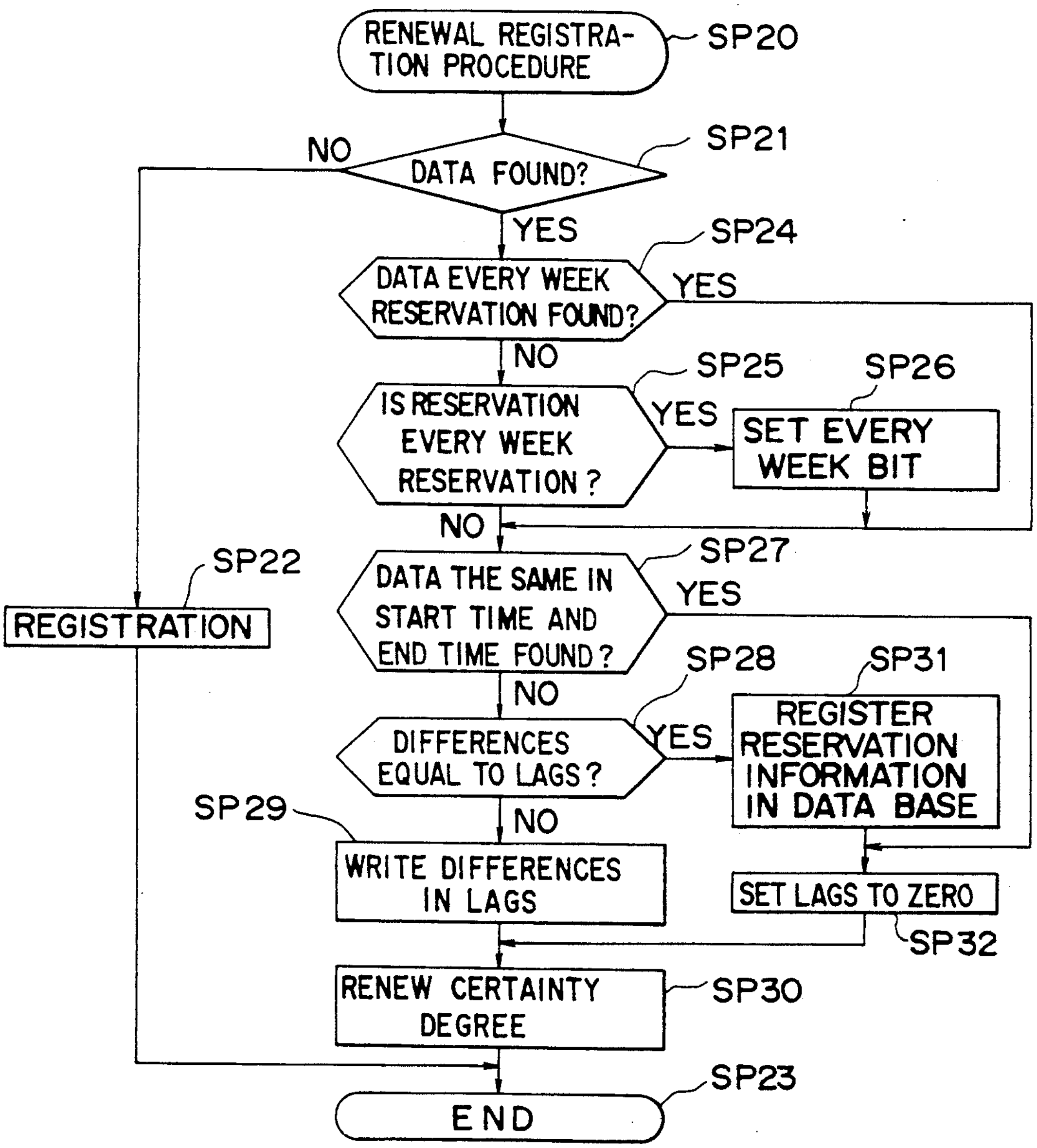
FIG. 16 is a flow chart showing the renewal registration procedure for the habit database.

As shown in FIG. 16, the habit learning control unit 16 proceeds from a step SP20 to a step SP21, starting the renewal registration processing by judging whether or not the registration packet, sent from the input sentence processing unit 6, contains reservation information elements for a program which has been already registered or stored.

More specifically, the habit learning control unit 16 searches for reservation information elements, which are identical to the reservation information elements in the registration packet, among the reservation information elements registered or stored in the habit database 14, including a day of the week, a continuous reservation end day with the exception of the most significant bit W, indicating whether or not the reservation information is an every week reservation, a channel, a channel attribute and the owner.

Furthermore, the habit learning control unit 16 searches for previously recorded reservation information elements in which the record start time and the record end time fall within the respective permissible ranges.

By this procedure, the habit learning control unit 16 judges whether a timer reservation for this program was previously 16 inputted based on the reservation information elements stored in the habit database 14.

When a timer reservation for this program was not timer reserved in the past, the reservation information elements cannot be found in the habit database 14 and hence a negative result is obtained in step SP21, and thus the habit learning control unit 16 goes to a step SP22, in which the reservation in the registration packet is registered or stored in the habit database 14.

At step SP22, the habit learning control unit 16 registers or stores registration packet in the habit database 14, setting differences in the start time and the end time to zero and the certainty degree to 20.

An every week reservation is recorded in the habit database 14 by setting the certainty degree to 60.

This is because an every week reservation has a high frequency of use, and such reservation is judged to be fairly certain.

An every week reservation is registered or stored taking its use into consideration by setting its certainty degree to a value larger than that of an ordinary reservation.

The habit learning control unit 16 completes the registration procedure by proceeding to a step SP23 after the registration of the timer reservation.

After the habit database 14 is initialized, the reservation information elements are accumulated in turn by repeating the timer reservation registration operation, and thereby the habit database of reservation information elements is constructed.

When a timer reservation for a program was previously inputted, identical reservation information elements for this program can be detected by searching in the habit database 14.

In this case, in the operation of the habit learning control unit 16 illustrated in FIG. 16, an affirmative result is obtained in step SP21, and a renewal of the registration packet starts by proceeding to a step SP24.

More specifically, in step SP24, the habit learning control unit 16 judges whether or not the previously inputted reservation for the same program as the reservation of the registration packet is an every week reservation. When a negative result is obtained, the program proceeds to a step SP25 in which it is determined whether or not the reservation of the registration packet is an every week reservation.

When an affirmative result is obtained from this judgement, the habit learning control unit 16 goes to a step SP26, in which a discrimination bit W of the every week reservation (FIG. 5) is set to a value of 1, and the habit database 14 is renewed for the searched reservation.

Thus, the habit learning control unit 16 changes the recorded reservation to an every week reservation and goes to a step SP27.

Alternatively, the habit learning control unit 16 proceeds directly to step SP27 when an affirmative result is obtained in the step SP24. In a step SP27, a judgement is made as to whether or not the reservation in the registration packet and the reservation found in the habit database agree in their record start time and record end time.

When a negative result is obtained in step SP27, the habit learning control unit 16 goes to a step SP28, in which after differences in the record start time and the reservation end time are detected, a judgement is made as to whether or not these differences are in agreement with the permissible lags on differences in the start time and the end time.

In a case where the reservation defined by a registration packet for example, as shown in FIG. 18, slightly differs in each of its record start time and the record end time, from the corresponding times in a previously registered reservation, shown for example in FIG. 17, a negative result is obtained in step SP28. Then, the habit learning control unit 16 proceeds to a step SP29.

In step sp29, the habit learning control unit 16 records or stores the differences or lags in the record start time and the record end time in the registration packet in respect to the start time and the end time of the previously registered reservation, as shown, in FIG. 19 and then goes to a step SP30, in which the degree of certainty is renewed.

More specifically, the degree of certainty of the registered or stored reservation is renewed by executing an operation according to the following equation:

$$\text{Renewed degree of certainty} = (\text{Current Value} + 100)/2 \tag{1}$$

and then the renewal registration procedure is completed in step SP23.

Thus, when a registration packet which is slightly differs in its record start time and its record end time, but is within the permissible range, is inputted, the differences in the record start time and the record end time are stored in difference or lag information elements in the start time and the end time respectively in this manner, and then a renewal operation is carried out to increase the degree of certainty of the recorded reservation. Thus, the habit database 14 is renewed.

The value of the certainty degree is gradually increased when a timer reservation is repeatedly recorded or stored for the same program.

On the other hand, when, after the habit database is renewed as shown in FIG. 19, for example, the registration packet of FIG. 18 is inputted again, an affirmative result is obtained in step SP28, and the habit learning control unit 16 goes to a step SP31.

In this step, the habit learning control unit 16 replaces the recorded reservation with the reservation of the newly inputted registration packet by renewing the habit database 14 using the reservation information of the registration packet.

Then, the habit learning control unit 16 proceeds to a step SP32, in which the difference information elements or lags for the start time and the end time are set to zero, after which it goes to the step SP30.

Thus, as shown in FIG. 20, when a timer reservation for a program is inputted two times after a reservation for this program was already recorded in the habit database 14, and the two timer reservations consist of exactly the same reservation information elements, then the habit database 14 is renewed to have the values of the second reservation information elements.

The renewal procedure of equation (1) is repeated by inputting the reservation for the same program three times, and hence the degree of certainty for the reservation is successively increased to 20, 60 and 80. Thus, the certainty degree is increased every time a timer reservation for the same program is inputted.

On the other hand, when a registration packet as shown in FIG. 18 is inputted while the recorded reservation is as shown in FIG. 20, or when a registration packet to initialize the database as shown in FIG. 17 is inputted while the recorded reservation is as shown in FIG. 19, an affirmative result is obtained in the step SP27, and then the habit learning control unit 16 goes to the step SP32.

Thus, in the habit database, the reservation information elements inputted most recently for a program are maintained and only the certainty degree is renewed, in which case the certainty degree increases every time that a timer reservation for the same program is inputted.

In this manner, in the habit database 14, reservation information elements of a new program are recorded or stored when a timer reservation is first inputted for the program, whereas a recorded reservation is renewed together with the degree of certainty thereof when another time reservation is inputted for the same program. Thus, the habit database is constructed to reflect the habits of the user.

The more often a timer reservation is repeated, the more the certainty degree of the reservation increases. Thus, for the reservations recorded in the habit database 14, it can be assumed that the larger the certainty degree thereof the more often such timer reservation has been made.

Even in a case where not all the reservation information elements are inputted, reservations which are in agreement in at least the inputted reservation information elements may be searched for in the habit database and the certainty degree thereof may be detected. In this manner, augmenting reservation information elements for a timer reservation which the user wishes to make can be roughly detected.

For example, a timer reservation operation can be assisted by displaying searched reservation information elements in a descending order of the in degree of certainty for an acceptability judgement by the user, and the incomplete reservation can be augmented therewith.

Thus, the timer reservation recording system 1 assists the user in making a timer reservation, and thereby the possibility of any erroneous input is minimized while the operation is simplified.

More specifically and with reference to FIG. 15, in the case where not all the reservation information elements needed to indicate a program are contained in a reservation sentence, a negative result is obtained in step SP13(FIG. 15), and the input sentence processing unit 6 goes to a step SP35 in which an inquiry packet is sent.

The inquiry packet is a search packet in which the reservation information elements which were not inputted by the user are set to zero.

Then the habit learning control unit 16 proceeds to a step SP36, in which a multiplying factor is determined for subsequent point addition processing of the degree of certainty.

For determining the multiplying factor for point addition processing, in the step SP36 the habit learning control unit 16 produces an inquiry mask from the inquiry packet, produced in step SP35 and as shown in FIG. 21. When reservation information elements having a value other than zero are in the inquiry packet, data with a value of 1 are put in corresponding areas of the inquiry mask.

Accordingly, the habit learning control unit 16 detects which reservation information elements have been inputted by the user by detecting mask data of value 1.

When only a day of the week is indicated in the input sentence, the habit learning control unit 16 sets the multiplying factor for point addition processing to a value of 1.5, whereas when only a day of the week and A.M. or P.M. are indicated, the multiplying factor is set to 1.3.

Similarly, when only a day of the week and a channel are indicated, the multiplying factor is set to 2, and when only a day of the week and a record start time or only a day of the week and a record end time are designated, the multiplying factor is set to 2.5.

Furthermore, when only a day of the week, a record start time and a channel are indicated, or only a day of the week, a record end time and a channel are indicated, the multiplying factor is set to 3. When only a day of the week, A.M. or P.M. and a channel are indicated, the multiplying factor is set to 2.5.

The habit learning control unit 16 then proceeds to a step SP37, in which reservations having reservation information elements which are identical to the reservation information elements in the inquiry packet are searched for among the habit database 14. In the case of the reservation start and end times, the search is conducted for stored start and end times within the permissible ranges of the corresponding information elements in the inquiry packet.

The habit learning control unit 16 subsequently proceeds to a step SP38, in which point addition processing is carried out on the degree of certainty of each reservation found in the search.

In point addition processing, the degree of certainty of each found in the search is multiplied by the multiplying factor for point addition processing set in the step SP36, so that the point addition processed degree of certainty reflects the probability of agreement of the reservation information elements found in the search with the program for which the user is inputting a timer reservation.

More specifically, even in a case where many reservations are found from a search based on in only a day of the week, the number of revelant reservations can be reduced if the search is conducted based on, additionally, a reservation start time.

Consequently, in each reservation found from a search, the probability of the reservation being for the same program as the program for which the user is inputting a timer the search is executed reservation differs depending on whether on based only a day of the week or based on both a day of the week and a reservation start time.

Thus, the degree of certainty, which increases according to the frequency of reservation inputting undergoes point addition processing to reflect the probability of agreement of the stored reservation information elements with the program for which the user is inputting a timer reservation.

Furthermore, in point addition processing, the difference in the reservation end time is detected between reservation information elements which are not identically in agreement, and weighting is made according to the difference.

More specifically, in a case where exact agreement exists in the reservation end time, it is judged that the reservation is very probably for the same program for which the user is inputting a timer reservation, whereas the larger the difference the smaller the degree of certainty.

Thus, the degree of certainty which is difficult to be quantitatively treated can be expressed in the outcome of point addition processing by weighting the degree of certainty according to the difference in the reservation end time.

In this embodiment, the habit learning control unit 16 performs the weighting of the degree of certainty using a membership characteristic function which has a value of 1 to 0.25 corresponding to a difference in the reservation end time of 10 to 40 minutes, and the database is thereby used employing the technique of fuzzy reasoning.

When a day of the week is not indicated, the habit learning control unit 16 returns to the step SP11 to display a message to prompt the user to provide a further input without executing the searching procedure.

Furthermore, in the step SP38 the habit learning control unit 16 performs a foot or small value cutting procedure, in which reservations having a point addition processed degree of certainty of a value 30 or below are detected and removed from the search outcome.

Then, in a step SP39, the reservations found after step SP38 are used to produce a return list, that is, a list of previously inputted reservations with reservation information elements identical to the inputted reservation information elements. In a step SP40 the habit learning control unit 16 sends the return list produced in the step SP30 to the input sentence processing unit 6 with the reservations on the return list in a descending order of degree of certainty.

When no reservations having a point addition processed degree of certainty value above 30 are obtained in the step SP38, the habit learning control unit 16 proceeds to the SP40 and sends a return list in which each of the reservation information elements is set to a value 0.

For example, when a reservation sentence "A record is to be taken from 8 P.M. on Sunday." is inputted (using the input sequence: RECORD FROM 8 P.M. SUNDAY), an inquiry packet having a zero value set except in the day of the week (SUNDAY) and the record start time (8 P.M., that is, 20:00 o'clock) is produced as shown in FIG. 22, and then the habit database is searched for previously inputted reservations specifying SUNDAY as the day of the week and 20:00 as the start time. Then, a return list or return lists as shown in FIG. 23, are returned.

The habit learning control unit 16 searches for reservation information elements recorded in the habit database identical to the reservation information elements in the inquiry packet, that is, inputted by the user, and successively outputs, to the input sentence processing unit 6, reservations having high probabilities of being for the same program for which the user is inputting a timer reservation.

In a step SP41 the input sentence processing unit 6 judges whether or not at least one return list has been returned When an affirmative result is obtained in step SP41 (which means that at least one reservation with a high probability of being for the same program inputted reservation elements has been found in the habit database 14), a return list with the reservation having the largest degree of certainty is displayed in the display unit 8 in a step SP42.

Thus, in response to the reservation information elements of an incompletely inputted reservation, the user is presented with augmenting reservation information elements with the largest probability of being for the same program from among the previously stored reservation information elements in the habit database 14.

In this event, the input sentence processing unit 6 displays a message such as "Do you wish to record this program?" together with the reservation information elements on the return list and then goes to a step SP43, in which it waits for an input of "Yes" or "No" from an operating member.

When the user actuates the operating member for inputting "No", thereby rejecting the displayed information elements, the input sentence processing unit 6 proceeds to a step SP44, in which a judgement is made as to whether or not another return list with reservation information elements has been returned.

When a plurality of return lists are returned in step SP41, an affirmative result is obtained in step SP44 and the input sentence processing unit 6 goes to a step SP45, in which a return list for the reservation with the second largest degree of certainty is displayed.

Thus, the reservations found by the habit learning control unit 16 are successively displayed beginning at the reservation with the higest degree of certainty by repeating a loop LOOP1 consisting of the steps SP43, SP44, and SP45, and thereby reservation information elements for augmenting a reservation incompletely inputted by the user can be successively displayed beginning from the most probable reservation.

On the other hand, when reservation information elements which the user needs are displayed, in the step SP43 an operating member "Yes" is actuated, thereby confirming the displayed information elements, and then, the input sentence processing unit 6 goes to the step SP14, in which the augmented reservation information is stored in the reservation information memory unit 10. Thus, a reservation which has been incompletely inputted is augmented to positively make a timer reservation.

Thus, the user may input a reservation sentence such as "A recording should be made in the afternoon on Sunday", without having to laboriously input all reservation information elements in an error-free manner, and a timer reservation may be easily made by actuating an operating member to confirm or reject augmenting reservation information which are displayed one by one according to the degree of certainty of the respective information.

Accordingly, making a timer reservation is simplified and a timer reservation can be easily input.

Moreover, reservation information elements can be recorded in the habit database 14, reflecting the user's habit, and making a timer reservation can be assisted with reference to the recorded reservation information elements. Thus, the likely program for which the user wishes to make a reservation can be speedly displayed and then a timer reservation input, and hence the timer reservation recording system 1 has enhanced facility.

Subsequently, the input sentence processing unit 6 converts the confirmed reservation of a return list to a registration packet in the step SP15 and outputs the registration packet to the habit learning control unit 16, and thus after the reservation of the return list is renewed, the input sentence processing procedure is completed in the step SP17.

In a case where a return list cannot be obtained as a result of the searching of the habit database 14, a negative result is obtained in the step SP41, and the input sentence processing unit 6 proceeds to a step SP46.

Similarly, when reservation information elements desired by the user are not contained in a return list, a negative result is obtained in the step SP44, and the input sentence processing unit 6 goes to the step SP46.

After displaying a message to prompt an input of insufficient missing reservation information elements, the input sentence processing unit 6 proceeds to a step SP47, in which it judges whether or not the insufficient reservation information elements have been inputted.

When a negative result is obtained in the step SP47, it is repeated until the missing reservation information elements are inputted. When an affirmative result is obtained in step SP47, in a step SP48 a judgement is made as to whether or not all the reservation information elements are inputted.

In the step SP48, a negative result is obtained when all the necessary reservation information elements are still not inputted, so the input sentence processing unit 6 returns to the step SP35, in which an inquiry packet is produced and then the habit database 14 is searched.

In this manner, the habit database 14 is searched according to the reservation information elements inputted, although in incomplete form, and thereby the missing reservation information elements for the desired program can be detected. Thus a timer reservation can be easily made.

When all necessary reservation information elements are inputted, an affirmative result is obtained in the step SP48 and then the input sentence processing unit 6 proceeds to the step SP14.

In step SP14, the reservation information is stored in the reservation information memory unit 10, then a registration packet is output to the habit learning control unit 16 in step SP15, so that in step SP16 renewal registration processing is executed on the habit database 14 and thereby a timer reservation is made.

(1-2-3) Modification of the Habit Database

Figure 24:
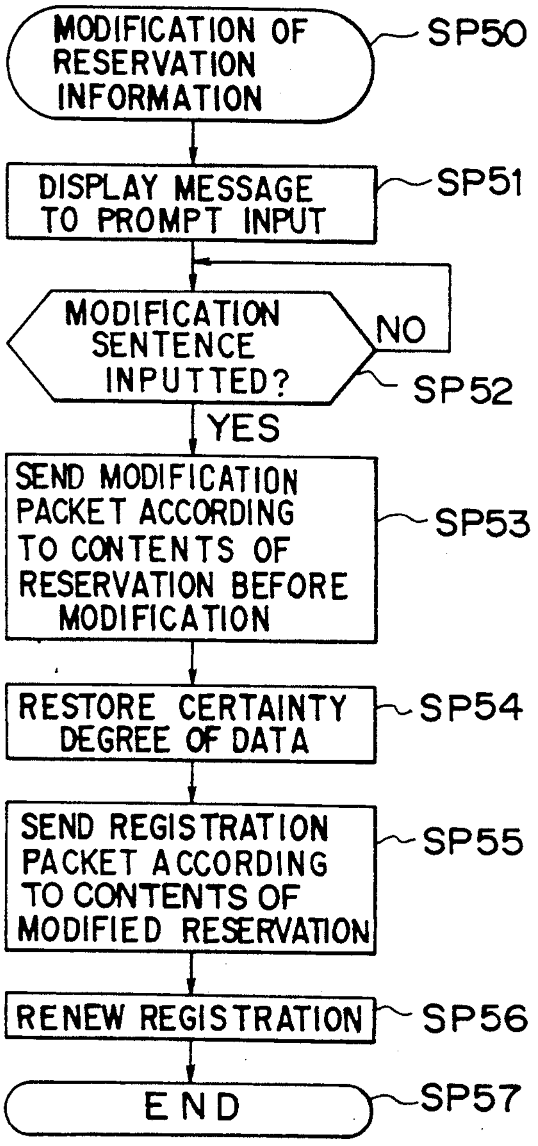
FIG. 24 is a flow chart showing the modification procedure of a timer reservation.

When a previously inputted timer reservation is modified by the user through operating the remote commander 2, the input sentence processing unit 6 and the habit learning control unit 16 execute a modification procedure as shown in FIG. 24, in which the habit database 14 which has been renewed with respect to the timer reservation is restored to its original state, that is, its condition before the timer reservation, and is then renewed again.

More specifically, the input sentence processing unit 6 moves from a step SP50 to a step SP51 when the operating member for "modification" ("change") on the remote commander 2 is actuated, and thereby a message to prompt an input is displayed.

The input sentence processing unit 6 displays a reservation stored in the reservation information memory unit 10 to assist the user's modification operation.

Subsequently, the input sentence processing unit 6 proceeds to a step SP52, in which it is judged whether or not a sentence which expresses the modification (hereinafter referred to as modification sentence) has been inputted.

A negative result is obtained in the step SP52 a modification sentence has not been entered, and the input sentence processing unit 6 repeats the step SP52. When a modification sentence has been entered, an affirmative result is obtained in step SP52, and the input sentence processing unit 6 proceeds to a step SP53.

In the step SP53, the input sentence processing unit 6 forms a modification packet from the reservation information element of the modification sentence which has been entered and sends it to the habit learning control unit 16.

As illustrated in FIG. 25, a packet ID which is different from that of registration packet is assigned to modification packet, and modification packet is distinguished from registration packet by this ID.

In response to a modification packet, in a step SP54 the habit learning control unit 16 detects reservation information elements for the same program as the program of the modification packet from the habit database 14 and restores their degree of certainty to its original value.

More specifically, a point subtraction processing operation according to the following equation (2), which corresponds to equation (1), is executed:

$$\text{Degree of certainty} = (2 \times \text{Current value}) - 100 \quad (2)$$

and the degree of certainty of the reservation information is restored to its previous value, before the timer reservation, as shown in FIG. 26.

Figures 27, 28:
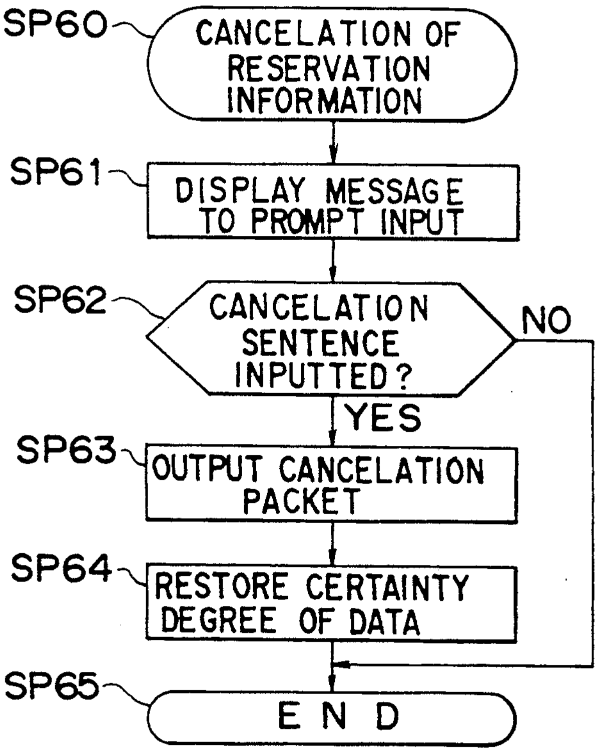

After restoring the degree of certainty to its previous value, in a step SP55, the input sentence processing unit 6 produces a registration packet from reservation information elements of the modification sentence as shown in FIG. 27 and outputs it to the habit learning control unit 16, and at the same time the input sentence processing unit 6 stores the reservation information elements in the reservation information memory unit 10 to set the timer reservation.

The habit learning control unit 16 compares the packets shown in FIGS. 25 and 27 and determines that there has been a change in the channel to be timer recorded.

In response to this change, in a step SP56 the habit learning control unit 16 executes renewal registration processing as described above with reference to FIG. 16 for the reservation of the registration packet shown in FIG. 27, and then the modification procedure ends in a step SP57.

Thus, even in a case where a timer reservation was first erroneously made, the timer reservation easily changed to a correct reservation by the modification procedure.

In this case, the habit database is changed to correctly reflect the user's habit by restoring the degree of certainty of the habit database 14 to its previous value.

CANCELATION OF A TIMER RESERVATION

In a case where a timer reservation which has been already set is to be canceled by operating the remote commander 2, the input sentence processing unit 6 and the habit learning control unit 16 restore the habit database 14, which has been renewed with respect to the timer reservation, to its previous state, that is, its condition before the timer reservation by executing a cancellation procedure as shown in FIG. 28.

More specifically, the input sentence processing unit 6 proceeds from a step SP60 to a step SP61 when the operating member labelled "Cancel" of the remote commander 2 is actuated. In the step SP61, a message to prompt confirmation of whether or not the timer reservation is canceled is displayed.

The input sentence processing unit 6 displays a reservation stored in the reservation information memory unit 10 to thereby assist the user in avoiding erroneous cancellation of a timer reservation.

Subsequently, the input sentence processing unit 6 proceeds to a step SP62, in which the operating member labelled "Yes" for confirmation is actuated, and a judgement is made as to whether or not a sentence to the effect that the timer reservation is canceled (hereinafter referred to as cancelation sentence) has been inputted.

When a cancelation sentence is inputted, an affirmative result is obtained, in the step SP62 and the input sentence processing unit 6 proceeds to a step SP63, in which a cancelation packet is formed according to the reservation information elements of the cancellation sentence inputted and is sent to the habit learning control unit 16.

Furthermore, the input sentence processing unit 6 Re-initializes the contents of the reservation information memory unit 10 and thereby cancels the timer reservation.

A packet ID which is identical to that of a modification packet and different from that of a registration packet is assigned to the cancelation packet, and the cancelation packet can be thereby distinguished from a registration packet.

In response to a cancellation packet, in a step SP64 the habit learning control unit 16 searches for reservation information elements for the same program as the program of the cancelation packet in the habit database 14 and executes a point substraction processing operation according to the equation (2) to restore their degree of certainty to its previous value.

When the degree of certainty is restored to the previous value, the input sentence processing unit 6 goes to a step SP65 and the cancellation procedure is completed.

Thus, even if the timer reservation is canceled, the habit database 14 is amended to have contents which correctly reflect the user's habit by restoring the degree of certainty of the habit database 14 to its previous value.

A timer reservation is easily and positively input with assistance from the reservation information previously recorded in the habit database 14.

When the operating member labelled "No" is activated in place of the operating member labelled "Yes", a negative result is obtained in the step SP62, and the input sentence processing unit 6 goes to the step SP65 thereby completing the procedure.

PERIODIC RENEWAL OF THE HABIT DATABASE

Figure 29:
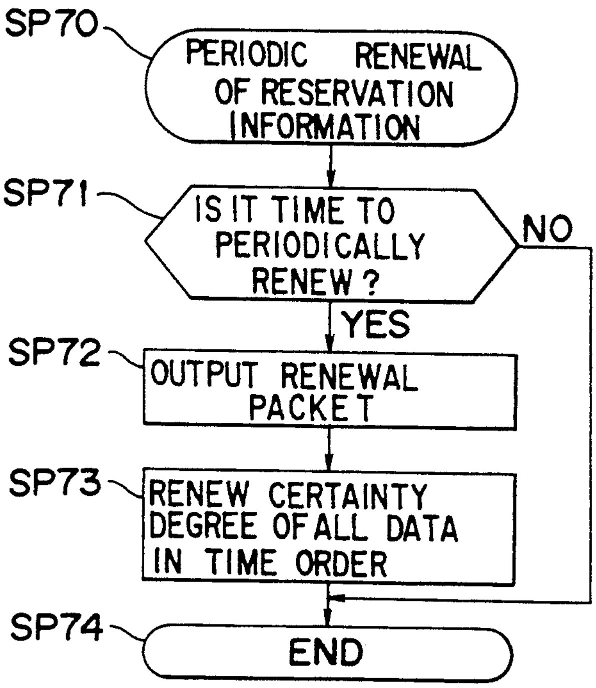
FIG. 29 is a flow chart showing the periodical renewal procedure for the habit database.

The input sentence processing unit 6 and the habit learning control unit 16 execute the a periodic procedure renewal as shown in FIG. 29 at a predetermined cycle to renew the habit database 14 periodically and thereby eliminate reservation information elements which have not been searched for in a long time.

More specifically, the input sentence processing unit 6 proceeds from a step SP70 to a step SP71, in which the input sentence processing unit 6 detects the present time of the timer and judges whether or not it is time to perform periodic renewal.

When it is time to renew, an affirmative result is obtained (in this embodiment, the periodic renewal is set to be made at midnight between Saturday to Sunday, and hence an affirmative result is obtained at that time), and then the input sentence processing unit 6 goes to a step SP72, in which a renewal packet is sent to the habit learning control unit 16.

A packet ID which is different from other types of packets is assigned to the renewal packet, and data of predetermined values are assigned to reservation information elements.

The habit learning control unit 16 renews the degree of certainty of each reservation information element recorded in the habit database 14 in a step SP73.

More specifically, in the case of an every week reservation the degree of certainty is reduced by 5% whereas in the case of all other reservations, the degree of certainty is reduced by 20%.

Furthermore a reservation having a degree of certainty below a predetermined value is canceled.

In this manner, reservation information elements which have not been searched for in a long time gradually decrease in the degree of certainty thereof and are finally eliminated from the habit database 14.

Thus, in the habit database 14, reservation information programs with high frequencies of input are recorded and thereby a database which reflects the user's habit is constructed.

When the periodic renewal operation of the degree of certainty is completed, the input sentence processing unit 6 proceeds to a step SP74 and ends the periodic renewal procedure.

On the other hand, when it is not time for periodic renewal, a negative result is obtained in the step SP71, and the input sentence processing unit 6 goes to the step SP74, in which the periodic renewal procedure is completed.

(2) Operation of the Preferred Embodiment

When in the case of the preferred embodiment described above, the remote commander 2 is operated to input an input sentence, the input sentence is analyzed in the input sentence processing unit 6 and is separated into reservation information elements.

In a case where all the reservation information elements which are necessary for a timer reservation are provided, the reservation information elements are stored in the reservation information memory unit 10 and a timer reservation is set.

Furthermore, a registration packet is formed from the reservation information elements, and the registration packet is outputted to the habit learning control unit 16.

In the habit learning control unit 16, reservation information elements corresponding to those of the registration packet are searched from for in the habit database 14, and thereby reservations for the same program which were previously recorded are found.

When reservation information elements for the same program were previously recorded in the habit database 14, the reservation information elements previously recorded are renewed, so that their degree of certainty increases.

On the other hand, when reservation information elements for the program were not previously recorded, the reservation information elements of the registration packet are recorded in the habit database 14.

In this manner, a database of reservation information of which elements having a degree of certainty which gradually increases by repeatedly making timer reservations for the same program is constructed, and the previously inputted reservation information elements are accumulated to reflect the user's habit.

Where a reservation is inputted in an incomplete form, an inquiry packet is formed from the inputted reservation information elements in the input sentence processing unit 6, and the inquiry packet is sent to the habit learning control unit 16.

In the habit learning control unit 16, the reservation information of elements the inquiry packet are searched for in the habit database 14, and the degree of certainty of the reservation information elements found from the search is point addition processed according to the degree of agreement in reservation information elements in the inquiry packet and found from the search. Then, reservation information elements are subjected to foot cutting processing, and a return list is constructed from the reservation information elements which were not cut.

Reservations on the return list are displayed one by one by sending to the input sentence processing unit 6 the reservation information elements in the descending order of their respective degrees of certainty.

Thus, the recorded reservation information elements which are most likely to be the reservation information elements for the same program for which the user is inputting a timer reservation are displayed, and a timer reservation is made based on the reservation information elements after confirmation by the user. In this manner, a timer reservation can be easily and positively made so as to reflect the habit of the user.

When a timer reservation already recorded is to be modified, the habit database 14 which has been renewed with respect to the timer reservation is restored to its previous state as of before the timer reservation, and the degree of certainty of the reservation information elements is thereby restored to previous value.

Furthermore, the habit database 14 undergoes renewal registration processing according to the modified reservation, and thereby a timer reservation can be modified with ease even if the timer reservation was first erroneously made. The habit database 14 is amended to correctly reflect the user's habit.

In a case where a timer reservation already set is canceled, the habit database 14 which was renewed with respect to the timer reservation is similarly restored to its previous state as of before the timer reservation, and thereby the habit database 14 can be amended to correctly reflect the habit of the user. When it is time for periodic renewal, all the reservation information elements the habit database 14 are renewed to reduce their degrees of certainty, and eventually elements of the reservation information which have not been searched for in a long time are eliminated.

Thus, in the habit database 14, the reservation information elements for programs with high frequencies of reservation input are accumulated, and hence a database which reflects the user's habit is constructed. In this manner, the making of a timer reservation by the user can be assisted.

(3) Advantages of the Preferred Embodiment

In a timer reservation recording apparatus according to the preferred embodiment described above, reservation information elements which were previously inputted are recorded in the habit database for each program together with certainty degree information representing the frequency of reservation inputting. The habit database is searched for timer reservations, and the outcome of the search is displayed according to the degree of certainty of the reservations found from the search, so that reservation information elements for the program for which the user wishes to make a timer reservation can be displayed one by one, reflecting the habit of the user.

A timer reservation can easily and positively be made by the user according to the display of the reservation information elements.

(4) Other Embodiments of the Present Invention

In the embodiment above described the habit database is renewed so as to increase the degree of certainty of the reservation information elements as the making of a timer reservation is repeated. The present invention is not limited to this and the renewal may reduce the degree of certainty.

In the latter case, a setting may be made in the input sentence processing unit 6 and the habit learning control unit 16 so that reservation element information with a low degree of certainty have priority.

In the preferred embodiment, there is illustrated a case where in the point addition processing, the degree of certainty of a reservation is multiplied by a predetermined multiplying factor according to the degree of agreement between the reservation information elements found from the habit database and the corresponding reservation information elements inputted by the user, but the multiplying factor for point addition processing in the case of agreement is not limited to this. The multiplying factor of the point addition processing may be changed to various values in view of utility.

Furthermore, in the preferred embodiment it is described that where there is a difference in the reservation end time, in point addition processing the degree of certainty is weighted according to the difference. However, the present invention is not limited to this and the reservation start time may also be weighted. Alternatively, the weighting processing may be omitted.

Point addition processing of the degree of certainty is described in the preferred embodiment, but the present invention is not limited to this. In place of point addition processing, the foot cutting values may be changed or the point addition processing may be omitted according to need.

In processing a timer reservation, the foot cutting values may be changed when insufficient reservation information elements are repeatedly inputted according to the value of the repetition.

In the embodiment above described, the user who makes a timer reservation is distinguished according to a reservation sentence, and thereby the making of a timer reservation is assisted for individual users. The present invention is not limited to this. In a case where the distinction is made by providing an operating member for discrimination distinction to the remote commander, data representing the owner may be omitted.

In the preferred embodiment, it is further described that the previously inputted reservation information is recorded in the habit database in a memory circuit configuration. The present invention is not limited to this, and the recording may be made in a secondary medium such as a memory card.

In the latter case, memory cards may be assigned to individual users in place of a data element in each reservation for representing owners.

In the embodiment above described, it is stated that a timer reservation is made using a natural language sentence format. The present invention is not limited to this and various reservation information input formats may be used.

Furthermore, making a timer reservation, using the remote commander is illustrated in the preferred embodiment. The present invention is not limited to this and various input methods may be used.

In the preferred embodiment, it is stated that timer reservation recording is carried out for a video tape recorder. The present invention is not restricted to this and may be widely applied to cases such as to timer reservation recording for frequency modulation broadcast programs or such as to apply the invention so as to actuate a television receiver by a timer.

Although an illustrative embodiment of the present invention, and various modifications thereof, have been described in detail herein with reference to the accompanying drawings, it is to be understood that the invention is not limited to that precise embodiment and the described modifications, and that various changes and further modifications may be effected therein by one skilled in the art without departing from the scope or spirit of the invention as defined in the appended claims.

What is claimed is:

1. In an apparatus for timer reservation recording including: input means for sequentially inputting reservation information elements indicating programs and their respective recording start and end times, displaying means for displaying said reservation information elements, storing means for storing said reservation information elements, and output means for outputting said reservation information elements from said storing means; the combination of database means for recording previously inputted reservation information elements together with respective certainty degree information which is renewed when said reservation information elements are recorded; and database management means operative when said reservation information elements are inputted to said input means, to search reservation information elements recorded in said database means for reservation information elements which are identical to the inputted reservation information elements, and to display, in an order according to said certainty degree information, reservation information elements obtained from the search as proposed reservation information elements for augmenting said inputted reservation information elements.

2. An apparatus for timer reservation recording according to claim 1, wherein said input means has operation members for sequentially inputting said reservation information elements which represent one or a plurality of words in a natural language sequence.

3. An apparatus for timer reservation recording according to claim 1, wherein said database management means also is operative to perform point addition processing of said certainty degree information for said reservation information elements obtained from the search, when at least one of said inputted reservation information elements is different from at least a corresponding one of said reservation information elements obtained from the search.

4. An apparatus for timer reservation recording according to claim 3, wherein one of said inputted reservation information elements indicates one of an every week reservation or a day of the week reservation, said certainty degree information has a value between 0 and 100, and reservation information elements for an every week reservation are recorded with a larger value of certainty degree information than reservation information elements for a day of the week reservation.

5. An apparatus for timer reservation recording according to claim 3, wherein said certainty degree information for said reservation information elements obtained from the search undergoes point addition processing when at least one of a recording start time or end time of said inputted reservation information elements is different from a corresponding one of a recording start time or end time of said reservation information elements obtained from the search.

6. An apparatus for timer reservation recording according to claim 5, wherein when said inputted reservation information elements are insufficient to indicate a program, a multiplying factor for said point addition processing is weighted according to the insufficiency of said inputted reservation information elements.

7. An apparatus for timer reservation recording system to claim 3, wherein said database management means also is operative to delete reservation information elements obtained from the search when said reservation information elements have certainty degree information of values smaller than a predetermined value.

8. An apparatus for timer reservation recording according to claim 3, wherein when reservation information elements are inputted to cancel a timer reservation for a program, said database management means is operative to perform point subtraction processing of said certainty degree information for the reservation information elements recorded in said database means which correspond to said program.

9. An apparatus for timer reservation recording according to claim 3, wherein said database management means is also operative to eliminate from said database means reservation information elements which have not been searched for in a predetermined time.

* * * * *